United States Patent
Braun et al.

(10) Patent No.: US 7,652,578 B2
(45) Date of Patent: Jan. 26, 2010

(54) DETECTION APPARATUS AND METHOD FOR NEAR FIELD COMMUNICATION DEVICES

(75) Inventors: Mark Braun, Elgin, IL (US); Louis Vannatta, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 276 days.

(21) Appl. No.: 11/926,734

(22) Filed: Oct. 29, 2007

(65) Prior Publication Data
US 2009/0109032 A1    Apr. 30, 2009

(51) Int. Cl.
*G08B 13/14* (2006.01)
(52) U.S. Cl. ............. 340/572.4; 340/572.1; 340/572.7; 340/10.1; 340/505; 455/41.1; 455/277.1; 235/451; 235/492
(58) Field of Classification Search ............. 340/572.4, 340/572.7, 505, 10.1; 455/41.1, 277.1; 235/451, 235/492
See application file for complete search history.

(56) References Cited

U.S. PATENT DOCUMENTS

| | | | | |
|---|---|---|---|---|
| 6,150,948 | A * | 11/2000 | Watkins | 340/693.3 |
| 6,834,251 | B1 * | 12/2004 | Fletcher | 702/150 |
| 6,889,905 | B2 * | 5/2005 | Shigemasa et al. | 235/492 |
| 6,952,167 | B2 * | 10/2005 | Wakabayashi | 340/572.5 |
| 7,245,222 | B2 * | 7/2007 | Bierach | 340/572.4 |
| 7,280,045 | B2 * | 10/2007 | Saarisalo et al. | 340/572.7 |
| 7,290,715 | B2 * | 11/2007 | Sellen et al. | 235/492 |
| 7,290,718 | B2 * | 11/2007 | Sekita | 235/492 |
| 7,432,809 | B2 * | 10/2008 | Malacarne et al. | 340/572.1 |
| 7,541,930 | B2 * | 6/2009 | Saarisalo et al. | 340/572.7 |
| 7,555,616 | B2 * | 6/2009 | Waters et al. | 711/154 |
| 2004/0134994 | A1 * | 7/2004 | Zaba et al. | 235/492 |
| 2004/0256460 | A1 * | 12/2004 | Charrat | 235/451 |
| 2005/0237198 | A1 | 10/2005 | Waldner et al. | |
| 2006/0241396 | A1 * | 10/2006 | Fabian et al. | 600/424 |
| 2007/0008140 | A1 * | 1/2007 | Saarisalo et al. | 340/572.7 |
| 2007/0164122 | A1 * | 7/2007 | Ju | 235/492 |
| 2009/0061768 | A1 * | 3/2009 | Simada | 455/41.1 |

FOREIGN PATENT DOCUMENTS

| | | |
|---|---|---|
| EP | 1840790 A2 | 10/2007 |
| KR | 10-2004-0009447 A | 1/2004 |
| KR | 10-2004-0107265 A | 12/2004 |

* cited by examiner

*Primary Examiner*—Daniel Wu
*Assistant Examiner*—Son M Tang
(74) *Attorney, Agent, or Firm*—Gary J. Cunningham; Phillip H. Burrus, IV

(57) ABSTRACT

A near-field communication circuit (100), such as a radio frequency identification circuit, includes a communication coil (104) and a communication circuit (108) configured to transmit data (109) through the communication coil (104). When the communication circuit (108) is in an idle mode, probing circuitry (124) is configured to detect the presence of a magnetically conductive object within close proximity of a communication coil (104). In one embodiment, a control circuit (110) selectively couples a capacitance (125) in parallel with the communication coil (104). The control circuit (110) then applies a probing signal (116) to the communication coil (104). A comparator (118) monitors a secondary parameter of the communication coil (104), such as inductance or impedance. When a magnetically conductive object is detected, the communication circuit (108) transitions to a communication state and attempts to communicate with the object.

20 Claims, 5 Drawing Sheets

DETECTION APPARATUS AND METHOD FOR NEAR FIELD COMMUNICATION DEVICES

BACKGROUND

1. Technical Field

This invention relates generally to electronic devices having near field communication circuitry, and more particularly to a device having a near field communication circuit with a low-power mode, the circuit being able to detect when other near field communication circuits are within close proximity.

2. Background Art

Mobile devices today are becoming increasingly complex. By way of example, a mobile telephone was used—no too long ago—only for making telephone calls. Today, however, some mobile telephones are equipped with near-field communication technology, such as radio frequency identification (RFID) circuits. This near field communication technology can obtain information from other near field communication devices, deliver information to near field communication terminals, and even engage in financial transactions.

By way of example, some mobile device manufacturers have recently developed electronic, or "virtual," cards in devices using near-field communication technology. For instance, Mastercard®, in conjunction with some mobile phone manufacturers, offers a virtual "PayPass"™ card that is stored within the memory of a mobile telephone. The virtual card is personalized (often by a trusted party on behalf of a financial institution) with information such as account number, name, and expiration date. This information is stored in memory as a virtual card. The mobile device then transmits the information wirelessly to payment terminals via near-field communication circuitry.

More modern devices are capable of operating as near-field readers as well. The near-field circuitry of these devices must be ON to start communication with a passive near-field device, such as a smart poster. (A smart poster is a poster that includes a near-field communication tag capable of being read by the wireless near-field transceiver. A smart poster for a movie may include a near-field communication tag having information about show times, movie merchandise, and the like. When a user passes an electronic device having a wireless near-field communication circuit within a predetermined distance of such a poster, the device may read the information and present corresponding information on the display.)

When reading such a smart poster, the user generally waves the electronic device having the near-field reader over the poster to download content or initiate an action such as launching a URL or dialing a number. However, the user must either press a button or otherwise use the user interface to enable the near-field reader. This process is cumbersome and inconvenient. The other alternative is to have the near-field reader continually ON, which impacts the battery life.

There is thus a need for an improved near-field communication circuit that does not operate continuously or require a user to actuate a button or interface.

Figure 1:
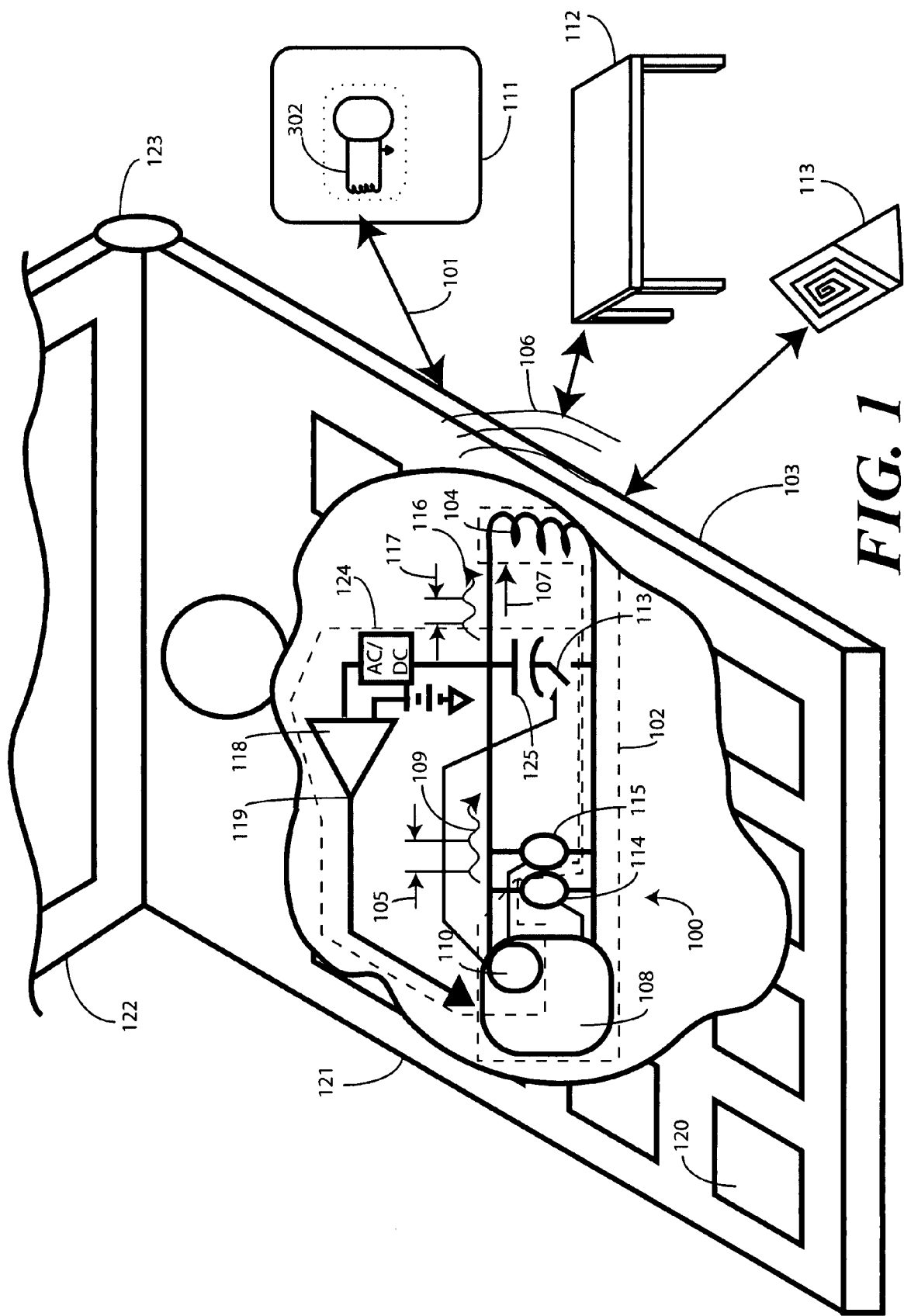
FIG. 1 illustrates one embodiment of an electronic device having a near-field communication circuit configured for detecting the presence of an external communication circuit in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to detecting the presence of an inductively coupled object relative to a near-field communication circuit. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of detection of the presence of near-field communication circuits as described herein. The non-processor circuits may include, but are not limited to, a radio receiver, a radio transmitter, signal drivers, clock circuits, power source circuits, and user input devices. As such, these functions may be interpreted as steps of a method to perform such detection. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

As noted above, near-field communication circuits are used to communicate with a variety of devices. For example, they communicate with payment terminals to make financial transactions. RFID circuits communicate with devices such as RFID tags, to gather information. Such tags may be passive devices that become active—i.e. become operational—devices when incident energy is received to deliver information back to the near-field communication circuit. Newly developing technology includes near-field communication circuits communicating with tags in objects such as smart posters.

To communicate with such devices, the near-field communication device reader requires power. As mentioned above, to detect objects such as smart posters, at any time desired by the user, conventional near-field communication devices must be either be ON all the time or manually actuated by the user. The near-field communication circuit has traditionally been powered all the time because the user may pass an electronic device near a smart poster (or other device) at any time, even when the device is in an idle state. This "continuously on" state tends to drain the battery in portable electronic devices.

Embodiments of the present invention work to reduce the overall power consumption in portable electronic devices having near-field communication circuits by employing a method for detecting the physical presence of external near-field communication coils prior to making any communication attempt. In one embodiment, a control circuit working with the near-field communication circuit in a portable electronic device periodically actuates a probing oscillator and monitors a secondary parameter, such as inductance or impedance of the local near-field communication coil. This change in inductance or impedance is indicative that a second coil, such as a coil associated with an RFID tag or reader, is within close proximity of the near-field communication circuit. Analysis has shown that average quiescent current drain may be reduced from a total current of around 50 mA in the conventional system to a total current of around 3-5 mA in embodiments of the present invention.

Turning now to FIG. 1, illustrated therein is one embodiment of a circuit 100 for detecting the proximate location 101 of an external object 111 with a near-field communication device 302 in accordance with the invention. The exemplary near-field communication circuit 100 of FIG. 1 is shown as being integrated into a portable electronic device 103. For simplicity of discussion, the portable electronic device 103 will be illustrated herein as a mobile telephone. However, it will be clear to those of ordinary skill in the art having the benefit of this disclosure that the portable electronic device 103 could be any type of portable electronic device, including portable computers, gaming devices, cameras, music players, video players, personal digital assistants, and so forth.

The near-field communication circuit 100 includes a communication coil 104 that is configured for near-field communication at a communication frequency 105. The term "near-field" as used herein refers generally to a distance of less than 1 meters. The communication coil 104 communicates by way of a magnetic field 106 emanating from the communication coil when a current 107 is applied to a coil, which is manufactured in one embodiment by forming a conductor loop on a printed wiring board. A communication oscillator 114 applies a current waveform to the coil 104. The resulting current 107 may be further modulated by the communication circuit 108, to transmit and receive data 109.

The communication circuit 108, which may be a microprocessor having a signal output running embedded code, a transceiver integrated circuit, an application specific integrated circuit, an RFID device, or equivalent device, is coupled to the communication coil 104. The communication circuit 108 works to communicate with other devices by transmitting data 109 in radio frequency form by inducing a current 107 through the communication coil 104 upon being excited by the communication oscillator 114. The communication oscillator 114 induces the current 107 at the communication frequency 105. The communication device 302 alters its load in order to modulate the field generated by communication device 100. Device 302 communicates information to device 100 using the load modulation. One may refer to the publicly available standard at www.ecma-international.org/publications/files/ECMA-ST/Ecma-340.pdf for more details. Where the near-field communication is RFID communication, for example, this frequency may be about 13.56 MHz as is directed by recognized RFID standards.

When transmitting data, the communication circuit 108 is in an active mode. This active mode is referred to herein as the "communication mode." When in communication mode, the communication circuit 108 and communication oscillator 114 collectively draw a relatively large amount of power compared to a conventional mobile telephone or other electronic device in a standby mode. To conserve power when not communicating, the communication circuit 108 also includes a low-power or sleep mode, which is known as an "idle mode." In the idle mode, non-essential functions, including the communication oscillator 114, various current sources, and the like, may be turned off so as to reduce the quiescent current drain of the near-field communication circuit 100.

When in the idle mode, there is no communication between the near-field communication circuit 100 and external devices 111,112,113. Thus, if a user were to pass the portable electronic device 103 over an external device 111, such as a smart poster, while in the idle mode, the near-field communication circuit 100 would not read the smart poster. To ensure that the near-field communication circuit 100 is capable of detecting such objects when the communication circuit 108 is in the idle mode, one embodiment of the invention includes additional circuitry capable of detecting the presence of another near-field communication coil by monitoring the secondary parameter of the communication coil 104, which may be inductance or impedance. Using inductance as an example, when only the local communication coil 104 is present, the secondary parameter of inductance will be only the self-inductance of the local communication coil 104. When another coil—or other magnetically coupled object—is present, the inductance will increase or decrease, being a summation of the self-inductance of the local coil and mutual inductance between the local coil and the external coil. Note that the external coil does not need to be powered to impact the inductance of the communication coil.

This additional detection circuitry 124, which in one embodiment comprises a probing oscillator that directly excites the coil, upon detecting an external device within close proximity to the near-field communication circuit 100, then brings the communication circuit 108 out of the idle mode and into the communication mode. The communication circuit 108 then attempts to communicate with the external object.

A first component of the detection circuitry 124 is the control circuit 110. The control circuit 110 may be integrated with the communication circuit 108. For example, where the communication circuit 108 is a microprocessor, the control circuit 110 may include specific software modules of the embedded code, the modules operating select outputs and inputs of the microprocessor. The control circuit 110 may also be a stand-alone device, such as a programmable logic module, an application specific integrated circuit, and so forth.

A capacitor 125 is coupled in parallel with the communication coil 104. In one embodiment, the control circuit 110 is configured to selectively couple the capacitor 125 across the communication coil 104. While a physical capacitor is shown in FIG. 1, and may be used with the invention, the circuitry itself will generally have a characteristic capacitance. Such a capacitance may appear across the terminals of the communication coil, for example. In an exemplary configuration, the control circuit 110 is configured to operate a switch 113 so as to selectively couple the capacitor 125 across the communication coil 104.

A probing oscillator 115 is configured to selectively apply a probing signal 116 at a probing frequency 117. The probing oscillator 115 and communication oscillator 114 may be integrated into a single oscillator that is capable of excitation at one or more frequencies. Alternatively, the probing oscillator 115 may be separate from the communication oscillator 114, may operate at a different frequency, and may consume less power than the communication oscillator 114. The probing oscillator 115 is responsive to the control circuit 110 in that the control circuit 110 dictates when the probing signal 116 is applied to the communication coil 104.

A comparator 118 is coupled to the communication coil 104 and is configured to sense the probing signal 116 across the capacitor 125. To do so, the control circuit closes the switch 113 when the probing signal 116 is applied.

The control circuit 110 initiates the external coil detection process. At select intervals, which may be at a predetermined rate, the control circuit 110 is configured to both couple the capacitor 125 across the communication coil 104 and to cause the probing oscillator 115 to apply the probing signal 116 to the communication coil 104. This detection process generally occurs when the communication circuit 108 is in the idle mode.

Once the probing signal 116 is applied and the capacitor 125 is coupled across the communication coil, the comparator 118 then senses the resulting signal across the parallel combination of the capacitor 125 and the communication coil 104. The magnitude of the resulting signal is a function of several factors. A predominant factor affecting magnitude is the inductance of the communication coil 104, which is in parallel with the capacitor 125. This inductance is a function of both the communication coil's self inductance and the mutual inductance of the communication coil 104 and external magnetically conductive devices proximately located with the communication coil 104. Thus, when a magnetically conductive device is within close proximity of the communication coil 104, its overall inductance will change, which affects the magnitude of the probing signal 116 being applied.

The comparator 118 includes an output 119 that changes state according with the changing inductance of the communication coil 104. This change occurs because the presence of an object that is magnetically coupled with the communication coil 104 results in a change in the magnitude of the probing signal 116. When this magnitude changes by at least a predetermined amount, the output 119 of the comparator 118 changes. For instance, when an external, magnetically conductive device is within close proximity of the communication coil 104, the output 119 is in one state. When there is no magnetically conductive device within close proximity of the communication coil 104, the output 119 of the comparator 118 is in another state. Note that when the electronic device 103 is "waved" across an object, the change in the magnitude of the probing signal will be transient in nature. To ensure that such transient changes are captured, an edge sensitive trigger mechanism may be used in place of a threshold sensitive mechanism.

The detection circuitry 124 is configured such that when an external, magnetically conductive device or object becomes proximately located with the communication coil 104, the output 119 of the comparator 118 is configured to transition from a first state to a second state. This transition, detected by the communication circuit 108, causes the communication circuit 108 to exit the idle mode and to attempt communication with the external, magnetically conductive device. In effect, detection of an external, magnetically coupled device—which may not necessarily be a near-field communication circuit—causes the communication circuit 108 to "wake up" and to attempt communication.

The attempted communication is to verify that the external, magnetically coupled device is in fact a near-field communication device. The two-step approach of first applying a probing signal 116, and then applying the communication signal and corresponding data 109 when another device is present significantly reduces overall power consumption of the near-field communication circuit 100, as the communication circuit 108 and communication oscillator 114 may be placed in an idle mode without the risk of missing detection of external near-field communication devices. To the end user, the two-step approach appears as if the communication circuit 108 and communication oscillator 114 are always ON, even though power consumption has been greatly reduced.

In another embodiment, rather than attempting to communicate with the external object, a second probing signal 116 having the communication frequency is applied to the communication coil 104. This works as follows: when the comparator 118 detects the presence of a magnetically coupled object, the control circuit 110 then excites the communication coil 104 with the communication oscillator 114, without bringing the communication circuit 108 out of the idle mode. Upon exciting the communication coil 104 with the communication oscillator, the comparator 118 may then indicate whether the external object might be a near-field communication coil, such as a 13.56 MHz RFID coil, or whether it is an object lacking near-field communication circuitry. This indication is confirmed by the communication circuit 108. If the comparator 118 determines that the external object is not a near-field communication circuit, then communication circuit 108 is left in idle mode.

In one embodiment, the frequency 117 of the probing signal 116 is less than the communication frequency 105. For example, a probing frequency of 1 MHz may be used. In RFID applications, this frequency is substantially less than the 13.56 MHz signal used for communication. When using a lower frequency, less power consumptive oscillators may be employed for detection. In another embodiment however, the frequency of the probing signal 116 and the communication frequency 105 are substantially the same. Such may be the case where a single oscillator device is used for both the communication oscillator 114 and the probing oscillator 115. In such an embodiment, the switch is not needed 113.

In one embodiment, the control circuit 110 causes the probing oscillator 115 to apply the probing signal 116 at a predetermined rate. Thus, the control circuit 110 is configured to both couple the capacitor 125 in parallel with the communication coil 104 by closing the switch 113, and to cause the probing oscillator 115 to apply the probing signal 116, at a predetermined frequency.

In another embodiment, the user may control the operation—including use of the detection circuitry 124—of the control circuit 110 by way of the user interface 120. For example, the user may wish to activate the detection circuitry 124, to deactivate the detection circuitry 124, or to alter the predetermined rate. The user makes these changes to the near-field communication circuit 100 through the user interface 120.

As shown in FIG. 1, there are many external, magnetically conductive objects and devices 111,112,113 that may alter secondary parameters of the communication coil 104. These include objects like smart posters 111, metal tables 112 having magnetically conductive properties, payment terminals 113, and the like. Additionally, it will be clear to those of ordinary skill in the art having the benefit of this disclosure that other near-field communication devices will also alter the secondary parameters, such as inductance, of the communication coil 104.

Figure 2:
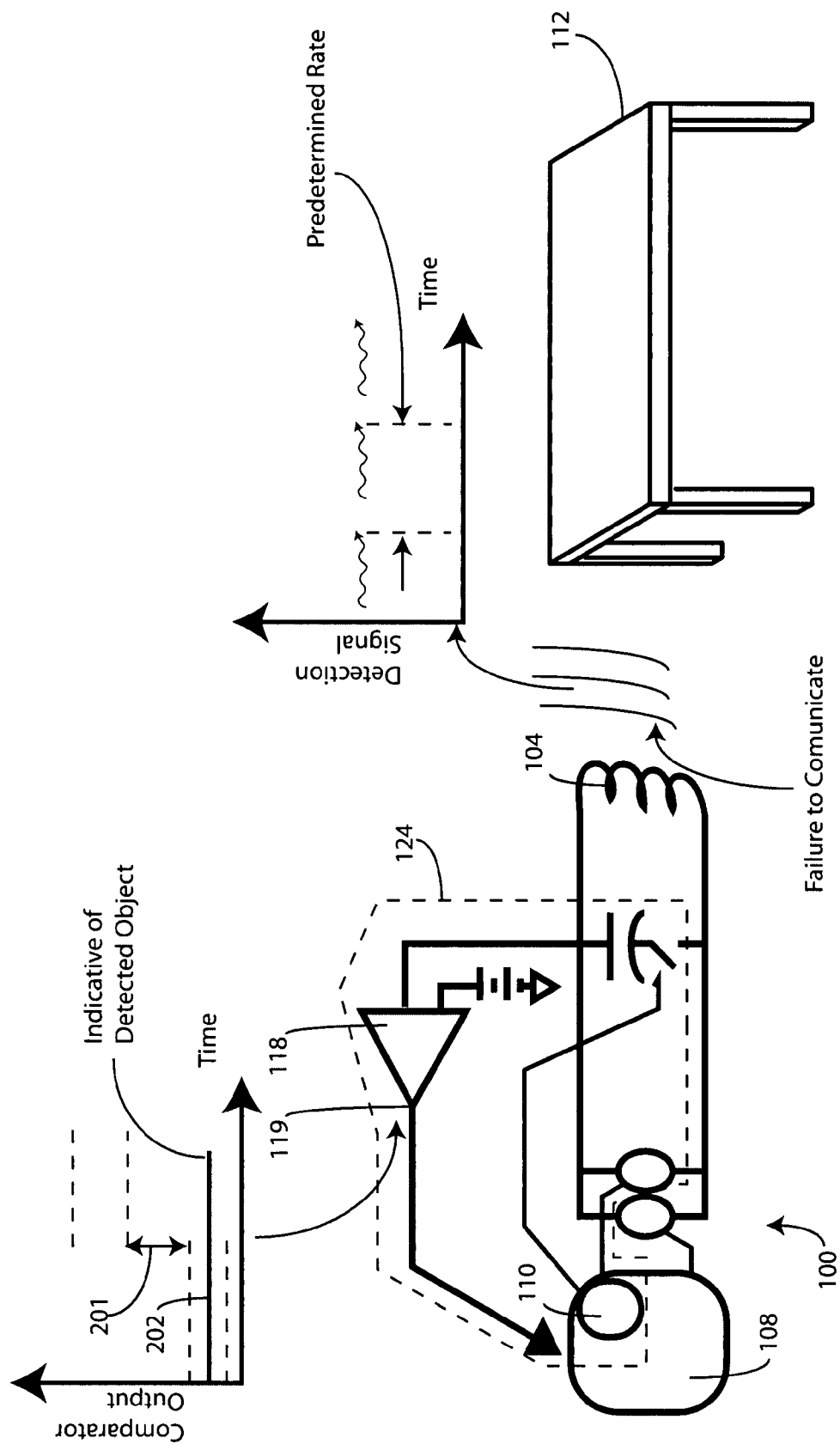
FIG. 2 illustrates one embodiment of an electronic device having a near-field communication circuit, the device being disposed proximately with a device unequipped with a near-field communication circuit.

While each of these objects may affect the secondary parameter, not all are capable of communication with the near-field communication circuit 100. Turning briefly to FIG. 2, illustrated therein is the near-field communication circuit 100 attempting to communicate with an external, magnetically conductive object. In FIG. 2, the external, magnetically conductive object is a metal table 112, which does not include near-field communication circuitry. Thus, the communication circuit 108 will continually be unsuccessful in communicating with the object detected by the detection circuitry 124. However, as long as the device is near the metal table 112, the detection circuitry 124 will continue to indicate that a magnetically coupled object is within close proximity of the communication coil 104 by keeping the output 119 of the comparator 118 in one state 202. For scenarios such as that shown in FIG. 2, it may be advantageous to limit the rate of application of the probing signal 116 to further conserve power.

In one embodiment, when the communication circuit 108 is unsuccessful in attempting communication, the predetermined rate of applying the probing signal 116 is reduced for at least a predetermined time. By way of example, if the near-field communication circuit 100 is configured to check for devices once every five seconds while the communication circuit 108 is in the idle mode, upon the communication circuit 108 entering the communication mode and failing to communicate with any external device, the predetermined rate of detecting once every five seconds may be extended to once every ten seconds.

This reduction in predetermined rate may continue for a predetermined time, such as ten minutes or an hour, or it may continue until the communication circuit 108 is successful in communicating with the external object. Other methods may be used as well. For example, when the device is sitting on the metal desk 112, it may be futile to attempt to communicate with external near-field communication circuits until the portable electronic device 103 is removed from the metal desk 112. In such a scenario, hysteresis or thresholds may be used such that the change in predetermined rate of detection continues until the probing signal across the capacitor 125 changes by at least a predetermined amount 201. The detection circuitry 124 may also perform an auto-zeroing function, and not bring the communication circuit 108 from idle mode until a change in the environment is detected.

Figure 3:
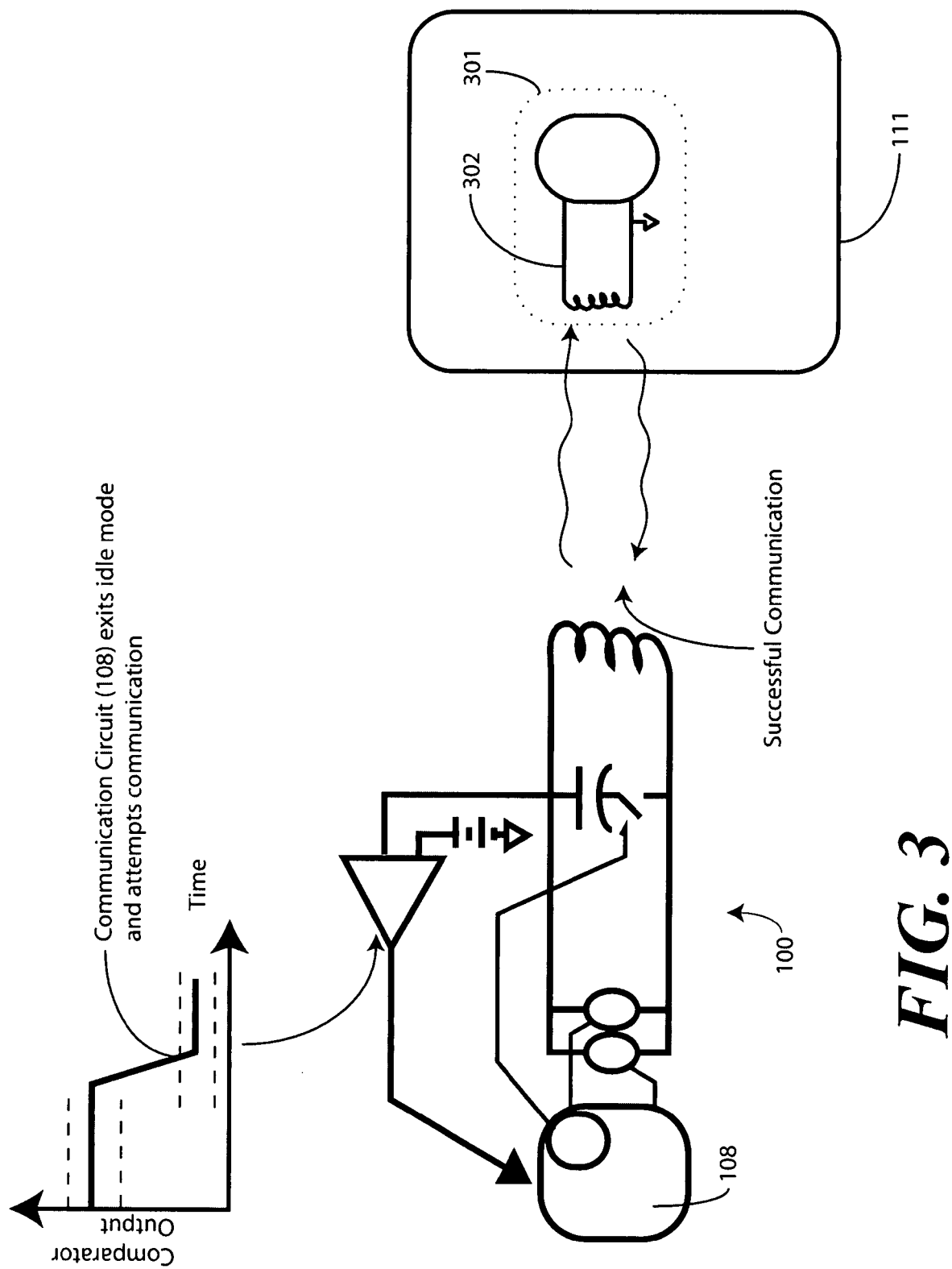
FIG. 3 illustrates one embodiment of an electronic device having a near-field communication circuit, the device being disposed proximately with a device equipped with a near-field communication circuit.

Turning now to FIG. 3, illustrated therein is a scenario where the near-field communication circuit 100 is successful in communicating with an external device. Specifically, as shown in FIG. 3, the near-field communication circuit 100 is communicating with an RFID tag 301 of a smart poster 111. When such a situation occurs, i.e. when the communication circuit 108 exits the idle mode, attempts communication, and is successful in communicating with the external object, it may be advantageous to increase the predetermined rate. Examining a use case, if a user is in a theater or museum and reads one smart poster 111 with the near-field communication circuit 100, this may be indicative that other smart posters will be read as well in the near future. As such, the predetermined rate of attempting detection once every five seconds may be increased to once every two seconds for a predetermined time.

Turning now back to the exemplary embodiment of FIG. 1, the portable electronic device 103 is shown as a foldable electronic device having a first housing 121, a second housing 122, and a hinge 123. Such a folding housing is often referred to as a "flip" housing. With flip housings, the portable electronic device 103 is generally idle when the flip is closed, and is active when the flip is open. As such, in one embodiment, activation of the detection circuitry 124 and the control circuit 110 is responsive to the device housing. Specifically, when the first housing 121 is closed relative to the second housing 122, the detection circuitry 124 is actuated when the housing is closed. The communication circuit 108 is actuated when the portable electronic device 103 is opened.

Figure 4:
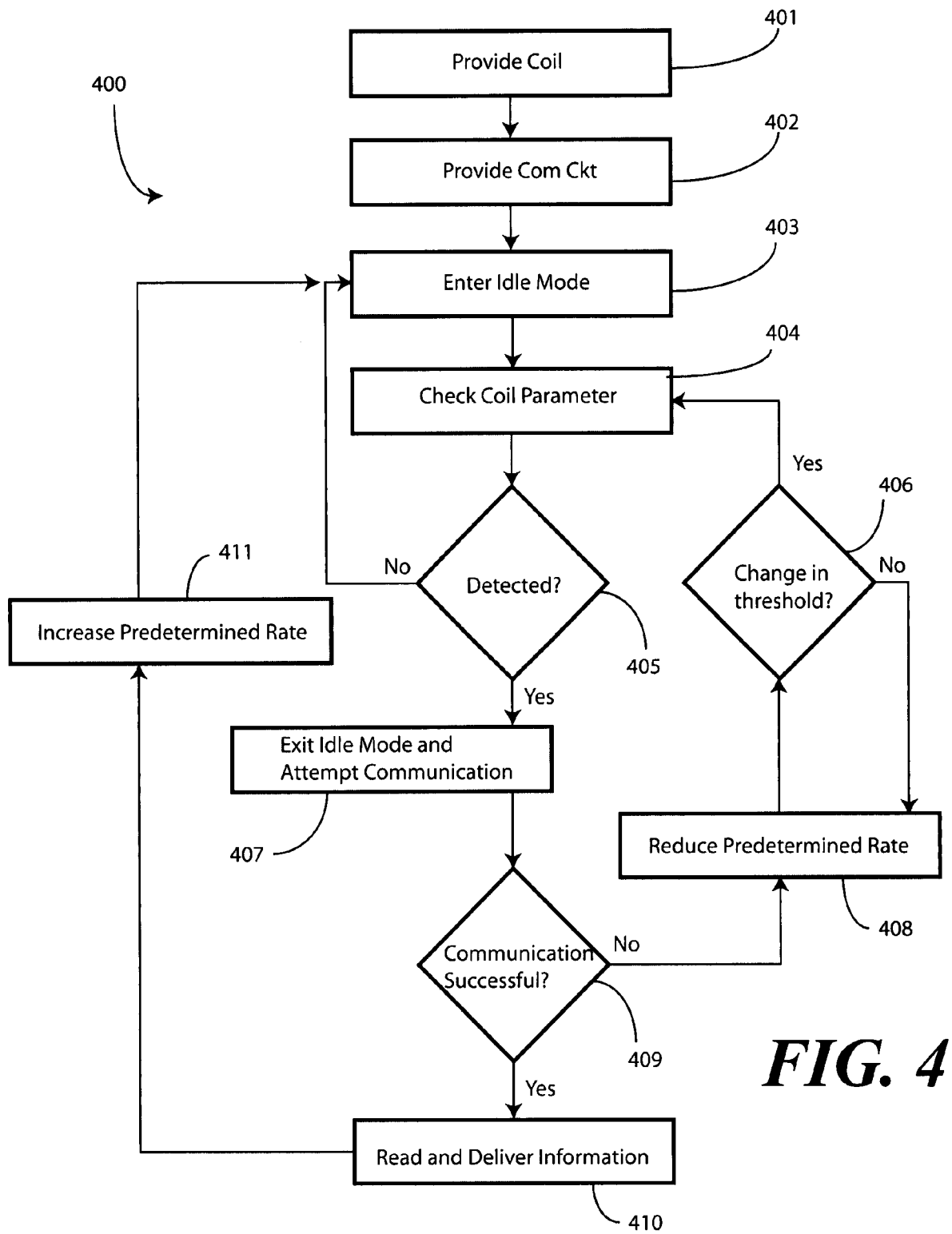
FIG. 4 illustrates one method of detecting the presence of an inductively coupled object relative to a near-field communication module in accordance with embodiments of the invention.

Turning now to FIG. 4, illustrated therein is one method 400 for detecting the presence of an inductively coupled object relative to the near-field communication circuit (100) in accordance with embodiments of the invention. As noted above, in one embodiment the near-field communication circuit (100) may be constructed with a microprocessor running embedded code. The method of FIG. 4 is suitable for coding such that the microprocessor executes the steps of the method 400. Similarly, the near-field communication circuit (100) may employ a state machine that executes the steps of the method 400. Other applications for the method 400 will be clear to those of ordinary skill in the art having the benefit of this disclosure.

At step 401 an electronic device having a communication coil and associated circuitry configured for near-field communication, such as that shown in FIG. 1, is provided. Similarly, to effect communication, a communication circuit, such as communication circuit 108 of FIG. 1, is provided at step 402. The communication circuit is configured to be capable of entering a reduced power, idle mode at step 403.

Once the communication circuit is in idle mode, a secondary parameter associated with the coil, such as coil inductance or impedance, is monitored at step 404. This secondary parameter is monitored while a probing signal is applied to the communication coil. The presence of an external, magnetically coupled device is determined at decision 405. As noted above, this decision may be made by detecting inductance changes in the communication coil caused by mutual inductance between an external, magnetically coupled device and the communication coil. Alternatively, this decision may be made by detecting a change—momentary in nature or continuous—in impedance of the communication coil caused by a magnetic coupling between the external coil and the communication coil.

Where an external, magnetically coupled device is detected, the communication circuit transitions from the idle mode to the communication mode at step 407. Upon exiting the idle mode, the communication circuit attempts communication with the external, magnetically coupled device to verify that it includes a near-field communication circuit. Successful communication is verified at decision 409. Where communication is unsuccessful, the communication circuit re-enters the idle mode at step 403.

As noted above, where communication is unsuccessful, it may be advantageous to reduce the rate of the application of the probing signal. In such a situation, the rate at which the probing signal is applied is optionally reduced at step 408. Similarly, in some embodiments it may be advantageous to not attempt communication until the detection circuitry indicates that the secondary parameter has changed by at least a predetermined amount. Where used, this change is detected at decision 406.

Where communication is successful, the communication circuit reads the information in the external device using the external device's near-field communication circuit at step 410 and reports the information to the user. As noted above, in some embodiments it may be advantageous to increase the rate at which the probing signal is applied, for at least a predetermined time, once successful communication is established. This increase in rate occurs at optional step 411.

Figure 5:
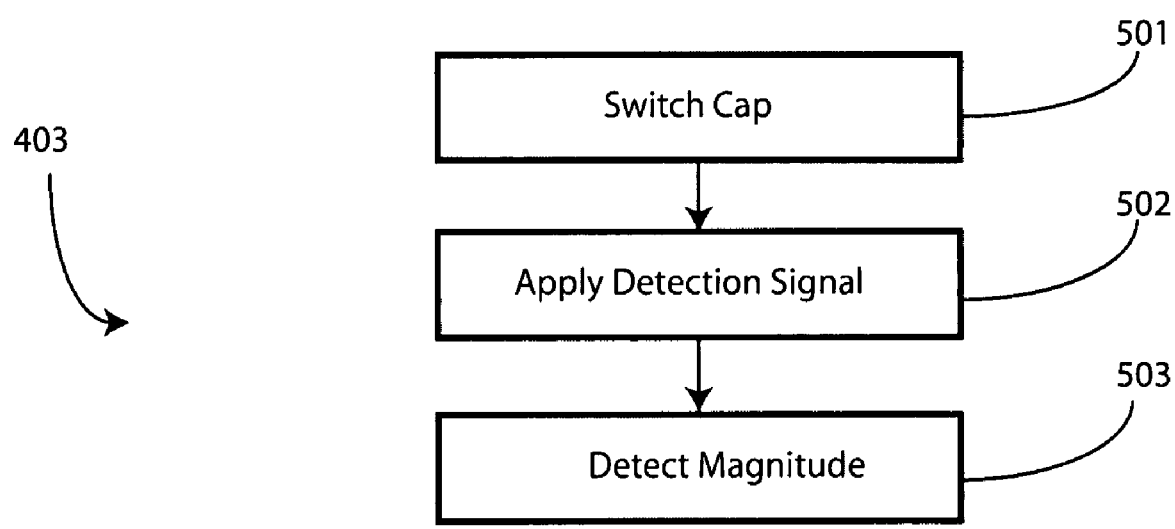
FIG. 5 illustrates one method of detecting the presence of an inductively coupled object relative to a near-field communication module while in a low-power mode in accordance with the invention.

Turning now to FIG. 5, illustrated therein is one method of executing the step 403 of checking for an external, magnetically coupled device. The method of FIG. 5 is suitable for use in a near-field communication circuit such as that shown in FIG. 1.

Specifically, at step 501, a capacitor is switched in parallel with the communication coil. As the probing signal to be applied is a high frequency AC signal, the magnitude of that signal across the parallel combination of the capacitor and communication coil will vary with the mutual inductance created by the communication coil and other magnetically coupled objects disposed within close proximity.

At step 502, the probing signal is applied to the communication coil. This signal, in one embodiment, is a 1 MHz signal (less than the frequency of the communication signal), and is applied at a predetermined rate. Further, the probing signal is applied while the capacitor is coupled in parallel with the communication coil. At step 503, the magnitude of the probing signal is detected across the parallel combination of the capacitor and the communication coil. Where the change in magnitude of the probing signal is at least a predetermined amount, the capacitor is switched out of parallel with the communication coil. Applying this criterion to this example, where the probing signal magnitude is below a predetermined threshold, indicative of a mutual inductance causing a reduction in total communication coil inductance, the capacitor is switched out of parallel with the communication coil. The communication circuit then transitions out of idle mode and into communication mode, attempting communication with the external device.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A circuit for detecting the proximate location of an external communication circuit with a near field communication device, the circuit comprising:
   a communication coil configured for near field communication at a communication frequency;
   a communication circuit coupled to the communication coil for transmitting data at the communication frequency, the communication circuit having at least a communication mode when transmitting data an idle mode when not communicating;
   a control circuit;
   a capacitor configured to be selectively coupled by the control circuit with the communication coil;
   an oscillator, responsive to the control circuit, configured to selectively apply a probing signal to the communication coil at a probing frequency; and
   a comparator coupled to the communication coil for sensing the probing signal across the capacitor;
   wherein the control circuit is configured to couple the capacitor with the communication coil and to cause the oscillator to apply the probing signal when the communication circuit is in the idle mode;
   wherein the comparator comprises an output coupled to the control circuit, the output configured to transition from a first state to a second state when a inductively coupled object is proximately located with the communication coil;
   wherein the presence of an inductively coupled object causes the probing signal across the capacitor to change by at least a predetermined amount thereby indicating the presence of the inductively coupled object.

2. The circuit of claim 1, wherein the probing frequency is less than the communication frequency.

3. The circuit of claim 2, wherein the control circuit is configured to couple the capacitor in parallel with the communication circuit and to cause the oscillator to apply the probing signal at a predetermined rate.

4. The circuit of claim 3, wherein the control circuit is configured to cause the communication circuit to transition from the idle mode to the communication mode when the output transitions from the first state to the second state.

5. The circuit of claim 4, wherein the communication circuit is configured to attempt communication with the inductively coupled object upon entering the communication mode, and upon the communication circuit communicating with the inductively coupled object, the predetermined rate increases for at least a predetermined time.

6. The circuit of claim 4, wherein the communication circuit is configured to attempt communication with the inductively coupled object upon entering the communication mode, wherein upon the communication circuit failing to communicate with the inductively coupled object, the predetermined rate decreases for at least a predetermined time.

7. The circuit of claim 6, wherein the predetermined time continues until the probing signal across the capacitor to change by at least a predetermined reset amount.

8. The circuit of claim 2, wherein the communication frequency is about 13.56 MHz.

9. The circuit of claim 1, wherein the communication circuit comprises a radio-frequency identification circuit.

10. The circuit of claim 1, wherein the communication frequency and the probing frequency are substantially the same.

11. A method of detecting a presence of an inductively coupled object relative to a near field communication module, the method comprising the steps of:
- providing a communication coil configured for near field communication at a communication frequency when in a communication mode;
- providing a communication circuit coupled to the communication coil, wherein the communication circuit is capable of entering an idle mode when not communicating;
- causing the communication circuit to enter the idle mode;
- switching a capacitor in parallel with the communication coil;
- applying a probing signal at a probing frequency to the communication coil while the capacitor is coupled in parallel with the communication coil; and
- sensing the probing signal across the capacitance;
- wherein when the probing signal across the capacitance is below a predetermined threshold, switching the capacitor out of parallel with the communication coil and causing the communication circuit to exit the idle mode and enter the communication mode.

12. The method of claim 11, wherein the step of applying the probing frequency occurs at a predetermined rate.

13. The method of claim 12, further comprising the step causing the communication circuit to attempt communication through the communication coil upon the communication circuit exiting the idle mode.

14. The method of claim 13, further comprising the step of increasing the predetermined rate upon the communication circuit successfully communicating through the communication coil.

15. The method of claim 13, further comprising the step of decreasing the predetermined rate until the probing signal across the capacitor changes in magnitude by at least the predetermined threshold before reapplying the probing signal.

16. The method of claim 13, wherein the communication frequency is higher than the probing frequency.

17. The method of claim 13, wherein upon the communication circuit failing to communicate through the communication coil, causing the communication circuit to re-enter the idle mode.

18. A portable electronic device, comprising:
- a near-field communication coil;
- a control circuit coupled to an oscillator, a comparator, and a capacitor, wherein the control circuit is configured to selectively couple the capacitor in parallel with the near field communication coil and to selectively actuate the oscillator at least at a probing frequency; and
- a near-field communication circuit, responsive to the control circuit, coupled to the near-field communication coil;
- wherein the control circuit couples the capacitor in parallel with the near-field communication coil and actuates the oscillator at the probing frequency when the control circuit is in an idle mode and not communicating;
- further wherein when an inductance associated with the near-field communication coil changes by more than a predetermined threshold as detected by the comparator, thereby indicating the presence of an inductively coupled object, the control circuit actuates the near-field communication circuit, enters a communication mode, and begins transmitting data.

19. The portable electronic device of claim 18, wherein the portable electronic device further comprises a user interface, wherein the control circuit is responsive to the user interface.

20. The portable electronic device of claim 18, wherein the portable electronic device comprises a moveable housing, wherein the control circuit is actuated upon a user closing the moveable housing.

* * * * *